April 20, 1943.　　　H. G. LOTHES　　　2,316,876
SLICING MACHINE
Filed June 23, 1941　　　2 Sheets-Sheet 1

Inventor
HERBERT G. LOTHES,

Attorney

April 20, 1943. H. G. LOTHES 2,316,876
SLICING MACHINE
Filed June 23, 1941 2 Sheets-Sheet 2
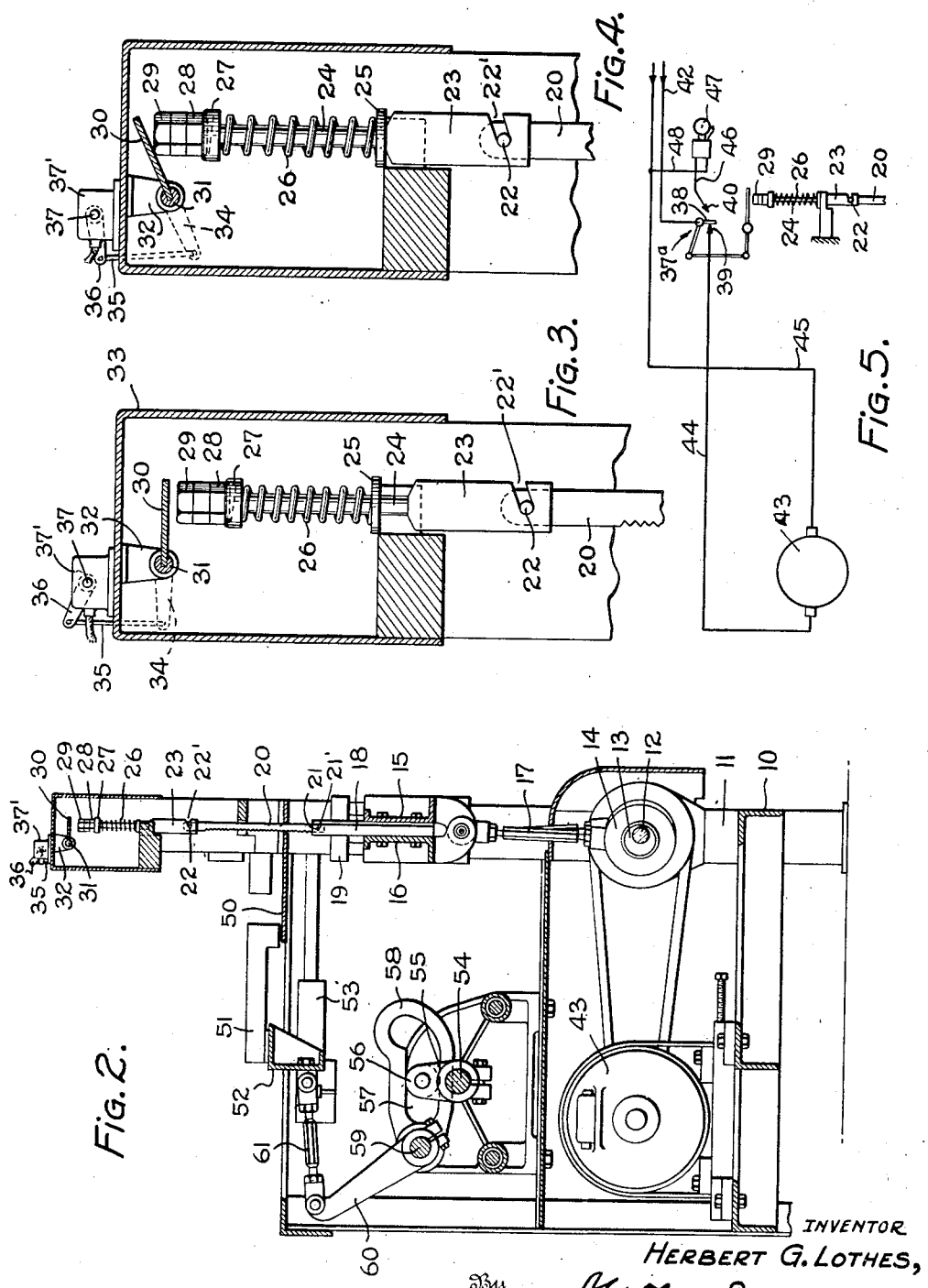
INVENTOR
HERBERT G. LOTHES,
By
Attorney Patented Apr. 20, 1943

2,316,876

UNITED STATES PATENT OFFICE 2,316,876

SLICING MACHINE

Herbert G. Lothes, Cincinnati, Ohio, assignor to The Kroger Grocery & Baking Company, Cincinnati, Ohio, a corporation of Ohio Application June 23, 1941, Serial No. 399,346

5 Claims. (Cl. 192—129)

This invention relates to slicing machines of that type employing a gang of reciprocating cutters or saws operating to sever material in elongated or bar form such as loaves of bread into a plurality of shorter pieces or sections, and has for an object to provide means in a machine of this type whereby should any one or more of the cutters or saws break or become detached while in operation, the machine will automatically stop and the operator warned so that he can immediately replace or repair the defective cutter or saw and resume operation, to thereby avoid the passage of uncut or unsliced material which might otherwise occur and permit a single operator to tend a series of machines or be employed on other duties about the shop or plant with a free mind.

Another object is to provide in a machine of the type specified a combined automatic stop and signal which will effect stoppage of the machine immediately upon breakage or detachment of a cutter blade or saw and at the same time give a visual or audible warning to an operator of the condition of the machine.

The foregoing and other objects and advantages will become apparent in view of the following description taken in conjunction with the drawings, wherein:

Fig. 2 is a transverse section of Fig. 1;

Figs. 3 and 4 are enlarged views of the upper portion of Fig. 2, Fig. 3 showing one of the cutter or saw blades and blade holder in normal operating position and Fig. 4 the position taken in the event of breakage or detachment of the blade; and Fig. 5 is an electrical wiring diagram.

Figure 1:
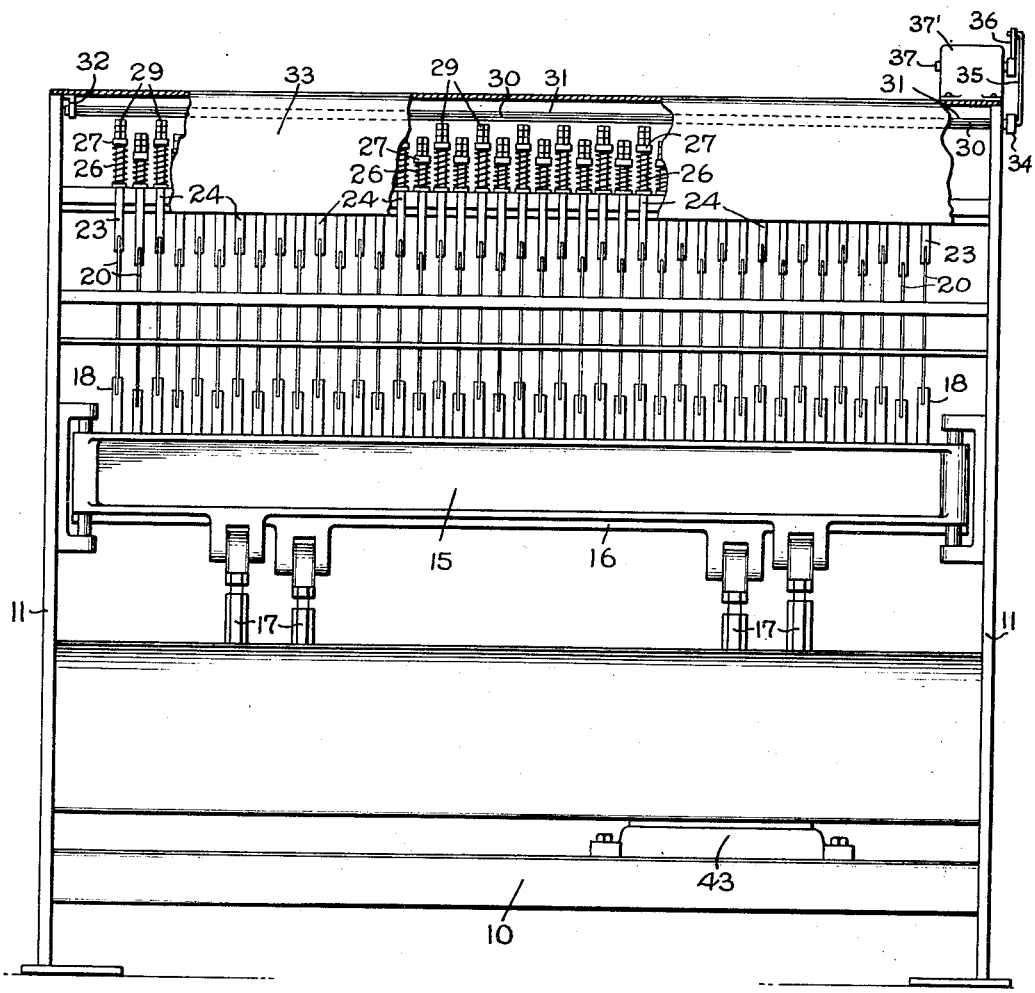
Fig. 1 is a view in broken front elevation of a bread slicing machine embodying the invention.

Referring to the drawings in detail, the machine comprises a main supporting frame including base members 10 and uprights 11 in which is rotatably mounted a cam shaft 12 provided with a series of cams or eccentrics 13 which act on bearing rings or collars 14 to transmit reciprocatory motion to cross heads 15 and 16 through connecting rods 17. Connected to the cross heads 15 and 16 are a series of blade holders 18, 18' which have vertical reciprocatory movement through guides 19.

The saws or cutters consist of relatively thin blades 20 which at their lower ends are provided with pins 21 engaging in downwardly inclined bayonet slots 21' formed in the lower blade holders 18, and at their upper ends are provided with pins 22 engaging in upwardly or oppositely inclined bayonet slots 22' formed in upper blade holders 23.

The upper blade holders 23 have rods 24 projecting upwardly therefrom through guides 25, and encircling each of these rods is a coil spring 26 which at its upper end abuts thrust washer 27. The tension of spring 26 may be adjusted by means of set nut 28 and adjusting nut 29.

The compression springs 26 act to normally maintain an upward pull or thrust on the blades 20 and blade holders 18 and 23. Should any one or more of the blades break or become accidentally disconnected from their associated blade holders, the upper holders 23 for such blades with their rods 24 will be thrust upwardly by the action of the springs 26.

Mounted above the line of cutters is an actuator or trip member 30 which as here shown is in the form of a flat panel or vane having its inner edge fixed in a shaft 31 journaled in hanger brackets 32 suspended from the hood or housing 33.

By referring to Fig. 1, it will be noted that the contact member 30 extends completely across the line of blades and is spaced from the tops of the nuts 29 such distance as to not interfere with the normal operation of the machine and yet effect contact and cause an upward movement of the member 30 in the event any one or more of the blades 20 break and release their associated upper blade holders 23. At its one end the shaft 31 has connected thereto an arm 34 which in turn connects through link 35 with an arm 36 secured on a pin or shaft 37 journaled in a housing 37' and forming part of a limit switch generally indicated at 37ª Fig. 5. This switch includes switch member 38 and coacting contacts 39 and 40. Electric current may be supplied through line 42 connected to the switch member 38 and thence through contact 39 and line 44 to a motor 43 having a driving connection with the cam shaft 12. The return side of the line or circuit is indicated at 45.

The contact 40 connects through line 46 with an audible signal unit 47. This signal may be of any conventional type and connects with the return lead 45 by means of line 48.

The bread slicing machine also includes a platform or shelf 50 to which loaves of bread may be delivered in any suitable manner, the bread being advanced against and through the gang of blades 20 by means of pusher or feeder 51 mounted on carriage 52, the latter being mounted for reciprocation in guides 53. The carriage 52 may be reciprocated by means of drive shaft 54 having secured on one end thereof crank arm 55, the latter carrying a roller crank pin 56 extending into a slot 57 of yoke 58. The said yoke at one end is fixed to a rock shaft 59 which is mounted at its opposite ends in suitable bearings and has fixed thereon a pair of spaced arms 60 connecting with the member 52 by means of links 61. Rotation of the shaft 54 oscillates the yoke 58 which in turn imparts movement to the rock shaft 59, arms 60 and carriage 52. The rock shaft 54 may be driven from a suitable source of power in timed relation with a conveyor, not shown.

In operation, loaves of bread or other material to be cut may be fed to the blades 20 automatically or manually. However, the machine is adapted for volume production in large baking establishments wherein the bread is fed automatically to one or a series of machines, the machines being maintained in continuous operation.

In the event any one or more of the blades or saws 20 break or become disconnected from their holders, the rods 24 are freed and forced upwardly by the springs 26 into contact with the trip member 30. This results in a rocking movement of the member 30, causing the arm 34 to pull downwardly on the arm 36, thereby moving switch member 38 clear of contact 39 and breaking the circuit to motor 43, stopping the latter. At the same time the switch member 38 is thrown into contact with contact 40, energizing the line 46 and sounding the audible signal 47. Thus an attendant is warned as to the condition of a machine and may immediately replace the defective blade. The apparatus insures against passage of unsliced bread through the machine, and which condition might be maintained indefinitely unless an attendant keeps close watch on the machine. With the use of the improved means herein described, one attendant may readily take care of a gang of machines and in fact may attend to other duties around the plant or shop with his mind free as to the condition of the bread slicing machines.

It will be understood that while the machine is primarily adapted for slicing bread and like material, it may be used for slicing or cutting other types of material, and also that limited changes in construction and design of the machine as herein disclosed may be made without departing from the spirit or scope of the invention as defined by the appended claims.

What is claimed is:

1. In a machine for slicing bread and like material, a gang of cutter blades and holders therefor, means mounting said blades and holders for reciprocatory movement, means for imparting reciprocation to said blades and holders including an electric motor, resilient means individually associated with said holders and whereby should any one of the blades become broken or freed from its holder, the latter will be forced upwardly out of normal operating position, a trip member common to all of said holders, means movably mounting said trip member, a limit switch mechanically connected to the trip member and electrically connected to the motor, the trip member having a portion located over the holders but spaced from the latter such distance as will permit normal operation of the holders and blades but in the event of breakage of one or more of said blades or disconnection of a blade from its holder, the holder will be forced upwardly by its associated resilient means and actuate the trip member and through said trip member throw the limit switch and stop the motor.

2. In a machine for slicing bread and like material, a gang of cutter blades and holders therefor mounted for reciprocatory movement, means for reciprocating said blades including an electric motor, means individually mounting said blades and holders whereby should any one of the blades be broken or freed from its holder the latter will be forced out of normal operating position, a trip member mounted adjacent said holders to be contacted by the latter in the event any one or more of the holders moves out of normal operating position, a switch having an electrical connection with said motor and a mechanical connection with said trip member whereby in the event the trip member is actuated the switch is thrown and the motor is stopped, and an electric signal unit operatively associated with said switch to be energized simultaneously with stopping of the motor.

3. In a machine for slicing bread and like material, a gang of cutter blades and holders therefor mounted for reciprocatory movement, means for reciprocating said blades and holders, means individually mounting said blades and holders whereby should any one of the blades be broken or freed from its holder the latter will move out of normal operating position, a trip member located adjacent said holders to be actuated by the latter in the event a holder moves out of normal operating position, and a signal associated with said trip member to be actuated thereby simultaneously with stopping of said reciprocating means.

4. In a machine for slicing bread and like material, a gang of cutter blades, individual holders for said blades, an electric motor operatively connected to said holders and blades for imparting substantially vertical reciprocation thereto, compression springs resiliently mounting said holders whereby should any one or more of the blades become broken or released from the holders therefor the latter will move a certain distance upwardly out of normal operating position, an elongated trip member common to all of said holders and extending over the tops of the latter and spaced therefrom such distance as will effect contact between the holders and said trip member and actuate the latter in the event any one or more of the holders move upwardly out of normal operating position, a bearing pivotally mounting said trip member, a limit switch, means mechanically connecting said trip member to said limit switch to actuate the latter, and means electrically connecting said limit switch to said motor whereby the drive is stopped should any one or more of the blades become broken or disconnected and the trip member actuated, the spacing between the tops of the holders and the trip member being such as to permit normal operation of the machine without actuating said trip member.

5. In a machine for slicing bread and like material, a gang of cutter blades mounted in substantial alignment, individual holders for said blades, there being an upper row of holders connected to the upper ends of the blades and a lower row of holders connected to the lower ends of the blades, an electric motor, means operatively connecting said motor with said lower row of holders whereby the blades are reciprocated vertically in alternate groups, compression springs resiliently mounting the upper row of holders whereby should any one or more of the blades become broken or released from the holder therefor the latter will move a certain distance upwardly out of normal operating position, an elongated trip member common to the upper row of holders and having a portion thereof extending over the tops of the latter and spaced therefrom such distance as will effect contact between said latter holders and said trip member and actuate the latter in the event any one or more of said holders move upwardly out of normal operating position, means pivotally mounting said trip member, a limit switch mounted adjacent one extremity of said trip member, means mechanically connecting said trip member to the limit switch to actuate the latter, and means electrically connecting said limit switch to said motor whereby the drive is stopped should any or more of the blades become broken or disconnected and the trip member actuated, the spacing between the tops of the upper row of holders and the trip member being such as to permit normal operation of the machine without actuating said trip member.

HERBERT G. LOTHES.